UNITED STATES PATENT OFFICE.

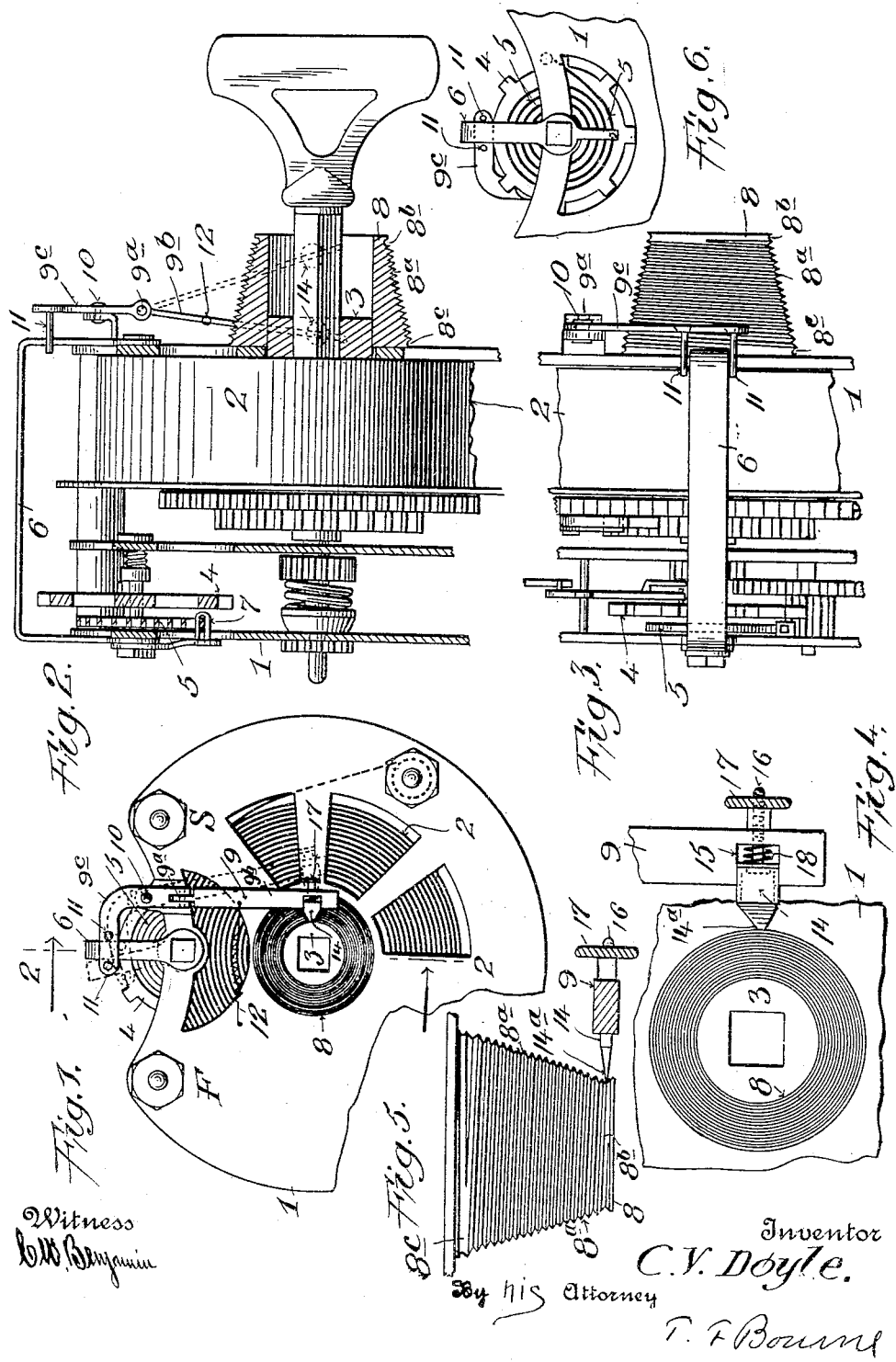

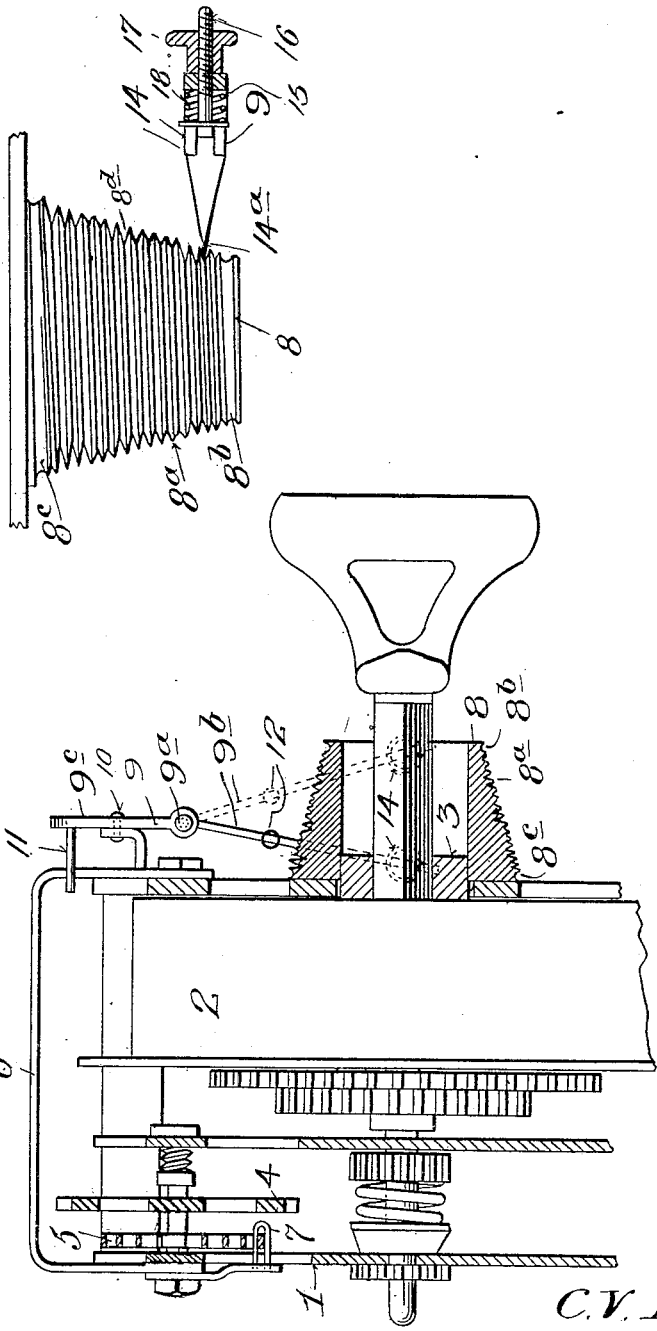

CLARENCE V. DOYLE, OF NEW YORK, N. Y., ASSIGNOR, BY DIRECT AND MESNE ASSIGNMENTS, OF SEVEN THIRTY-SECONDS TO CHARLES W. MOFFITT, OF ISLIP, NEW YORK, SEVEN THIRTY-SECONDS TO HARRY A. HANIGAN, OF NEW YORK, N. Y., AND FOUR THIRTY-SECONDS TO J. BYRON CREAMER, OF ISLIP, NEW YORK.

TIMEPIECE.

1,204,417.   Specification of Letters Patent.   Patented Nov. 14, 1916.

Application filed March 11, 1915. Serial No. 13,535.

*To all whom it may concern:*

Be it known that I, CLARENCE V. DOYLE, a citizen of the United States, and resident of New York city, borough of Manhattan, in the county of New York and State of New York, have invented certain new and useful Improvements in Timepieces, of which the following is a specification.

The object of my invention is to provide simple and efficient means to automatically regulate the speed of time pieces, or in other words, to automatically move or adjust the regulator for the balance wheel or escapement if the time piece or movement tends to run fast or slow.

I have illustrated my improvements as applied in conjunction with a spring-driven clock movement having a hair spring coacting with the balance wheel, with means intermediate the regulator for the hair spring and a rotary member of the movement, such as the main spring winding arbor, for causing movement of said regulator according to whether the movement tends to run fast or slow at any period after the main spring has been wound.

In the particular embodiment of my invention illustrated in the accompanying drawings I have shown the main spring arbor as provided with a helically threaded cone-like enlargement or piece coacting with an arm or lever carried by the movement, and operatively connected with said regulator, the parts being so arranged that as the main spring arbor and said threaded enlargement rotate, said arm will be moved to actuate the regulator in such manner that if the time piece tends to run fast for the first period of, say, three days after being wound, the regulator will be correspondingly moved in a direction to cause the time piece to run relatively slower, and if the time piece tends to run slow during or after, say, the fourth day after being wound, the regulator will be automatically moved to cause the time piece to run proportionately faster, whereby the time of the clock will be automatically regulated to a substantially constant speed or equal daily time indication during its period of winding.

My invention is particularly applicable to so-called eight-day or twelve-day clocks, whose main springs frequently exert more pressure than is necessary when first wound, and an inadequate amount of pressure after running for several days, causing a variation in correct running during the period for which the clock is wound, my improvements serving to correct or reduce such variations.

My invention also comprises novel details of improvement and combinations of parts that will be more fully hereinafter set forth and then pointed out in the claims.

Reference is to be had to the accompanying drawings forming part hereof, wherein, Figure 1 is a partly broken face view of a spring-driven clock movement embodying my invention; Fig. 2 is an enlarged section substantially on the line 2, 2, in Fig. 1; Fig. 3 is a plan view of Fig. 2, parts being omitted; Fig. 4 is an enlarged detail view of part of Fig. 1, showing the arm 9 in a different position; Fig. 5 is a plan view of Fig. 4; Fig. 6 is a detail view looking from the left in Fig. 2. Fig. 7 is an enlarged sectional view illustrating means for moving the regulator in one or another direction while the actuator moves in one direction, and Fig. 8 is a partly sectional detail view, enlarged, of part of Fig. 7.

Similar numerals of reference indicate corresponding parts in the several views.

The time piece or clock movement, indicated generally at 1, may be of any suitable construction adapted to be used in conjunction with my improvements, 2 indicating the main spring, 3 its winding arbor, 4 the balance wheel, 5 the hair spring coacting therewith, and 6 the regulator for the hair spring having connection with the latter at 7 in a usual manner.

At 9 is an arm or lever pivotally carried by the frame of the movement, as at 10, and adapted to coact with the regulator 6.

At 8 is a piece adapted to actuate arm 9. Said piece 8 is shown in the form of an enlargement secured upon arbor 3, although said piece may be secured to or formed on and operated by any desired member of the movement. Said enlargement 8 is shown provided with a helical thread $8^a$. While I have shown the enlargement 8 as substantially in cone-like form, with the helical thread $8^a$ upon its periphery, it will be understood that the form and shape of the piece 8 may be altered in any desired manner to produce the results herein set forth in accordance with the character or tension of the main spring 2 of the movement.

I have shown the arm 9 as provided with a joint at 9ª, whereby the portion 9ᵇ of said arm may rock in and out or relatively to the axis of enlargement 8 as the latter rotates, while the part 9ᶜ of said arm may maintain a substantially relative position with respect to regulator 6 at all times, although the entire arm may rock if desired as it moves along enlargement 8. The part 9ᶜ of said arm is suitably connected with regulator 6, for which purpose I have shown the part 9ᶜ provided with spaced pins 11 receiving a portion of the regulator for moving the latter back and forth. A suitable spring 12 connected with the arm or lever and with the frame of the movement serves to maintain the arm 9 in relative position with respect to enlargement 8. In order to reduce friction between the parts 8 and 9, I have shown the latter part as provided with a projection 14 having a reduced or pointed end at 14ª to coact with the thread 8ª of enlargement 8 to readily traverse the said thread. To provide for adjustment of arm 9 with respect to enlargement or piece 8, and thereby to cause desired initial setting or adjustment of regulator 6 with respect to enlargement 8, I have shown the projection 14 as adjustably carried by arm 9, for which purpose said projection 14 is shown slidably supported in a recess 15 in said arm and provided with a threaded stem 16 projecting through said arm and having a threaded nut 17 coacting with said arm, a spring 18 interposed between arm 9 and projection 14 tending normally to maintain the set relation of said parts. Any suitable means may be provided, however, for retaining projection 14 in set position on arm 9.

In the following example it will be assumed that the main spring 2 is of such character that, when it is wound, the movement would run three minutes fast the first day, two minutes fast the second day, one minute fast the third day, at normal speed the fourth day, one minute slow the fifth day, two minutes slow the sixth day, and three minutes slow the seventh day. The variation of speed having been ascertained, the projection 14 will be set with respect to arm 9 and enlargement 8 in such manner as to cause the regulator 6 to be initially set a suitable distance to one side of the dividing line between "Fast" and "Slow", say about two points nearer "Slow" than it should be in the normal position or when it is directly at the center position. As the spring is wound and the spirally threaded enlargement 8 rotates with the key, the projection 14, following the spiral thread 8ª, will advance toward the outer portion of enlargement 8 and arm 9 will move toward the axis of the winding arbor to the position substantially as shown in Fig. 5, whereby regulator 6 will then be at a position tending to cause the movement to run proportionately slowly. Such position of the regulator during the first day tends to overcome or to reduce the three minutes fast speed that the movement otherwise would tend to indicate, the regulator 6 being gradually moved to the left in Fig. 1 by reason of the rotation of the enlargement 8, since its thread 8ª tends to cause the arm 9 to move laterally owing to the increasing diameter of enlargement or actuator 8 over which the projection 14 travels as the thread 8ª causes arm 9 to advance toward the movement; during the second day the same action occurs tending to overcome the aforesaid two minutes fast that the movement would otherwise run, causing the regulator to move toward the left in Fig. 1 an appropriate amount, and a corresponding action occurs during the third day, whereupon the regulator is gradually brought toward the normal or required position at which time the prime mover or spring 2, in the example given, would normally cause the clock to run at the correct speed. During the fourth day, as arm 9 continues to be moved away from the axis of the winding arbor, the regulator 6 will then be moved toward "Fast" to cause the movement to run proportionately faster to overcome the one minute that would have been lost under the example given, and so on during the sixth and seventh days after the aforesaid winding, advancing the regulator 6 toward "Fast" in proportion to cause the movement to run faster than otherwise would be effected by the gradually decreasing pressure of the main spring. At the latter time the projection 14 will be adjacent to the inner or larger portion of arm actuator or enlargement 8, substantially as indicated in Fig. 2. By reason of the joint in arm 9, at 9ª, the portion 9ᵇ thereof may move toward and from the movement without interfering with the action of the portion 9ᶜ with respect to regulator 6, while at the same time the portion 9ᶜ may be rocked on pivot 10 by the portion 9ᵇ of such arm or lever.

It will be understood that when the movement ordinarily would run slow, as toward the end of the week, the tooth or projection 14, having reached the bottom of the thread 8ª, where the diameter of enlargement 8 is greatest, the regulator will be slightly nearer to "Fast" than to "Slow," thus overcoming the tendency of the movement to run slow. It will be understood, of course, that the movement of the regulator will be gradual and will correspond with the gradually reduced pressure of the main spring, whereby the reduction of pressure of the main spring is utilized to cause the hair spring to increase the speed of the balance wheel, and vice versa. When the main spring is rewound by the key, the corresponding rotation of actuator or enlargement 8 with the main spring arbor causes the projection or tooth 14 to travel outwardly toward the least transverse diameter of enlargement 8. At the outer end of actuator or enlargement 8 I have shown the thread 8ª continued in an annular manner at 8ᵇ, and at the inner or larger portion of enlargement 8 I have shown the thread 8ª also continued in an annular manner at 8ᶜ, whereby if the spring 2 be overwound the projection or tooth 14 may continue to travel in the annular channel 8ᵇ, and, likewise, if the clock should continue to run beyond the allotted time for action of the enlargement 8 the projection or tooth 14 would continue to travel in the annular groove 8ᶜ, without injurious effect in either case.

By means of my improvements it will be possible to provide efficient means for causing time piece movements to run more accurately than with mere dependence upon their prime mover, such as a main spring, and my invention is particularly applicable to the class of relatively cheap timepiece movements in which the main springs cannot be so accurately tempered and adjusted as to maintain even running of the clock for several consecutive days for one winding.

If it be found that a given prime mover or main spring does not vary in accordance with the example hereinbefore given, then in such case the working surface of enlargement 8 may be shaped to accord with the non-variation or the variation of spring pressure according to the days succeeding the day on which the time piece is wound, as, for instance, if the time piece were found to run two minutes fast for each of the first and second days, and then one minute fast for the third day after winding, or correspondingly slow for any of the days after the intermediate day of a series of days, then the contour of the enlargement 8 can be shaped accordingly, to cause the arm 9 to move the regulator 6 in the desired proportion. Means for such purpose are shown in Figs. 7 and 8, wherein some of the threads 8ª of actuator 8 are deeper than others, whereby as the actuator rotates in one direction the arm 9 will move inwardly to cause the regulator to move in one direction, or the arm 9 will move outwardly to cause the regulator to move in another direction, according to the position of the projection 14 in connection with the threads 8ª of the regulator. Where the spring has non-variation for a period of time, say for a day or two during a week's running, the actuator may be shaped accordingly to retain the regulator from movement, as illustrated at 8ᵈ, Fig. 8, where the actuator may have equal diameter for a desired distance. It will thus be seen that by shaping the regulator in accordance with the variation or non-variation of the prime mover or spring 2, for different days or periods of time, the regulation of the running of the timepiece may be automatically controlled to accord with such variation or non-variation of the prime mover or spring to regulate the timepiece.

While I have illustrated and described a particular embodiment of my invention, it will be understood that the same is not limited to the details of construction and arrangements of parts set forth, as the same may be varied, within the scope of the appended claims, without departing from the spirit of the invention.

Having now described my invention what I claim is:—

1. A time piece having a prime mover, a member connected therewith to be rotated at will and to be rotated by said prime mover, a regulator, and means coacting with said member and regulator to move the latter in one direction or another according to the direction of rotation of said member.

2. A time piece having a prime mover, a member connected therewith to be rotated at will and to be rotated by said prime mover, a regulator, an arm coactive with said regulator, said member having an actuator for said arm provided with different transverse diameters and having a helical thread to coact with said arm to cause the latter to traverse said actuator according to the direction of rotation of said member.

3. A time piece having a prime mover, a member connected therewith to be rotated at will and to be rotated by said prime mover, a regulator, an arm coactive with said regulator, said member being provided with a helical thread of varying diameter, whereby said arm may be rocked and moved relatively to the axis of said member for moving said regulator in one direction or another according to the direction of rotation of said member.

4. A time piece having a prime mover, a winding arbor therefor provided with an actuator having a cone-like surface provided with a helical thread thereon, an arm coactive with said actuator and having a part operative with said thread, and a regulator coactive with said arm.

5. A time piece having a main spring, a winding arbor therefor, a balance wheel, a hair spring therefor, a regulator for the hair spring, an arm coactive with the regulator, said arm having a joint, and a threaded actuator operative with said arbor and coactive with said arm for moving the regulator as said arbor rotates, said joint permitting the arm to move laterally along the actuator.

6. A time piece having a prime mover, a winding arbor therefor, a threaded actuator operative with said arbor, an arm pivotally carried by the movement to coact with said actuator, said arm having a joint between said pivot and actuator, and a regulator coactive with said arm, said joint permitting the arm to move laterally along the actuator.

7. A time piece having a movable member provided with an actuator having a helical cone-like thread, an arm provided with a projection to coact with said thread, means to adjustably support said projection on said arm, and a regulator coactive with said arm.

8. A time piece having a movable member provided with an actuator having a helical cone-like thread, an arm having a recess, a projection movably supported in said recess to coact with said actuator, means to retain said projection in set position, and a regulator coactive with said arm.

9. A timepiece having a movable member, an actuator operated thereby, said actuator having a helical thread and annular threads communicating therewith, a regulator, and means coactive with said actuator and regulator for actuating the latter by the former.

10. A timepiece having a movable member, an actuator operated thereby, said actuator having a helical cone-like thread and annular threads at opposite ends of said helical thread and communicating therewith, a regulator, and means coactive with said actuator and regulator for actuating the latter by the former.

Signed at New York city, in the county of New York, and State of New York, this 10th day of March, A. D. 1915.

CLARENCE V. DOYLE.

Witnesses:
T. F. BOURNE,
MARIE F. WAINRIGHT.

Copies of this patent may be obtained for five cents each, by addressing the "Commissioner of Patents, Washington, D. C."